(12) United States Patent
Bedient

(10) Patent No.: US 6,318,302 B1
(45) Date of Patent: Nov. 20, 2001

(54) RETRACTABLE LEASH SUPPORT

(76) Inventor: Brad C. Bedient, 3751 Brooklyn La., Lake Worth, FL (US) 33461

( * ) Notice: Subject to any disclaimer, the term of this patent is extended or adjusted under 35 U.S.C. 154(b) by 0 days.

(21) Appl. No.: 09/878,617

(22) Filed: Jun. 11, 2001

(51) Int. Cl.[7] .................................................. A01K 1/04
(52) U.S. Cl. ............................................................ 119/786
(58) Field of Search .................................... 119/786, 769, 119/780, 783, 784, 787, 788, 789, 791

(56) References Cited

U.S. PATENT DOCUMENTS

| 3,123,052 | * | 3/1964 | Marshall . | |
|---|---|---|---|---|
| 3,665,892 | | 5/1972 | Kusisto . | |
| 3,716,029 | | 2/1973 | Pillsbury, Jr. . | |
| 4,509,462 | * | 4/1985 | Pickett .............................. | 119/117 |
| 4,620,506 | | 11/1986 | Stubbs . | |
| 4,796,566 | * | 1/1989 | Daniels ............................... | 119/124 |
| 5,497,732 | * | 3/1996 | Moffre et al. ........................ | 119/784 |
| 5,575,241 | | 11/1996 | Line . | |
| 5,732,659 | * | 3/1998 | Wiggins ............................... | 119/787 |
| 6,055,939 | | 5/2000 | Stelljes . | |

* cited by examiner

Primary Examiner—Thomas Price
(74) Attorney, Agent, or Firm—Henderson & Sturm LLP

(57) ABSTRACT

A rotating retractable leash support including a base with a vertical support and a rotatable bracket arm attached to the upper end. A retractable leash is releasably attached to the bracket arm with the free end of the leash extending out through an eyelet at the distal end thereof. The eyelet is generally horizontally aligned with the leash at the level where it extends from the housing and provides a lever arm to facilitate the rotation of the bracket arm in the direction of the animal as it moves around the vertical support. The retractable leash is releasably attached to the bracket arm by a pin that extends through the closed loop that defines the hand grip.

10 Claims, 2 Drawing Sheets

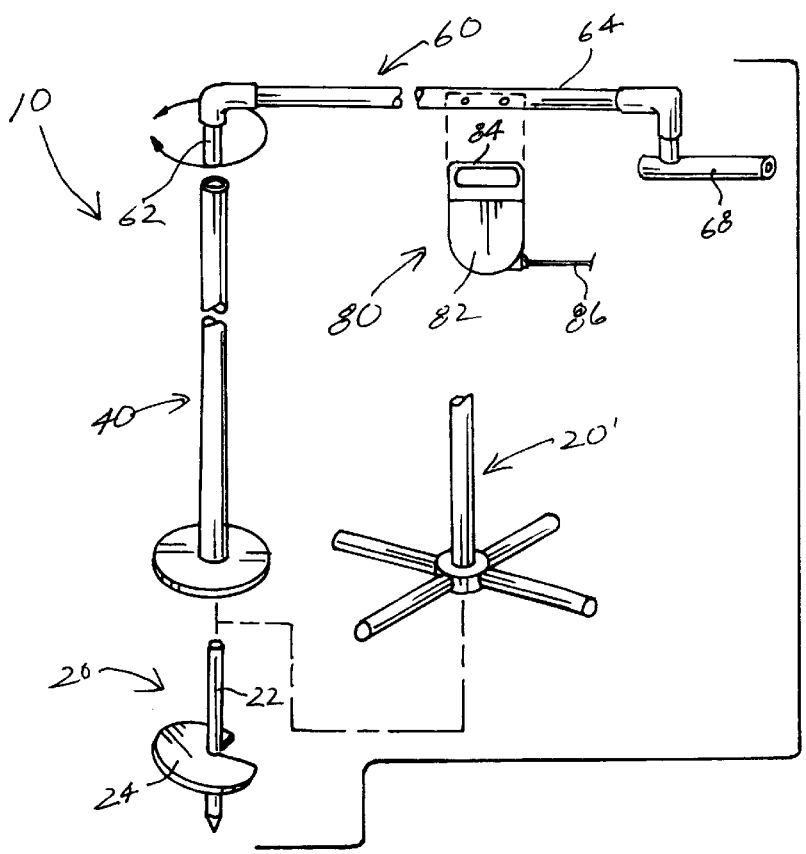
Fig. 4
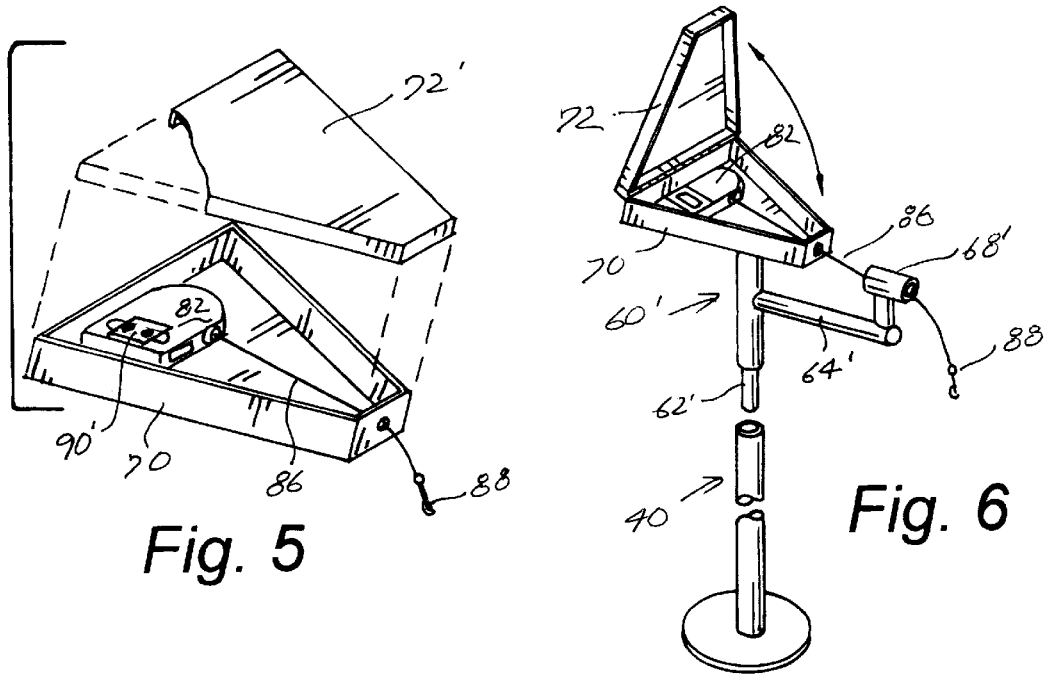
Fig. 5
Fig. 6

RETRACTABLE LEASH SUPPORT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of animal restraint systems, and more particularly to a retractable leash support.

2. Description of Related Art

As can be seen by reference to the following U.S. Pat. Nos. 3,665,892; 3,716,029; 4,620,506; 5,575,241 and 6,055,939, the prior art is replete with myriad and diverse animal restraint systems.

While all of the aforementioned prior art constructions are more than adequate for the basic purpose and function for which they have been specifically designed, they are uniformly deficient with respect to their failure to provide a simple, efficient, and practical animal restraint system.

As a consequence of the foregoing situation, there has existed a longstanding need for a new and improved animal restraint system and the provision of such a construction is a stated objective of the present invention.

BRIEF SUMMARY OF THE INVENTION

Briefly stated, the present invention provides a rotating retractable leash support including a base with a vertical support and a rotatable bracket arm attached to the upper end. A retractable leash is releasably attached to the bracket arm with the free end of the leash extending out through an eyelet at the distal end thereof. The eyelet is generally horizontally aligned with the leash at the level where it extends from the housing and provides a lever arm to facilitate the rotation of the bracket arm in the direction of the animal as it moves around the vertical support. The retractable leash is releasably attached to the bracket arm by a pin that extends through the closed loop that defines the hand grip.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is an exploded perspective view showing alternate base structures that may be used;

FIG. 5 is an enlarged partial exploded perspective view illustrating a container that forms a part of an alternate embodiment of the invention; and FIG. 6 is a perspective view of another alternate embodiment showing a container with a hinged cover.

DETAILED DESCRIPTION OF THE INVENTION

Figure 1:
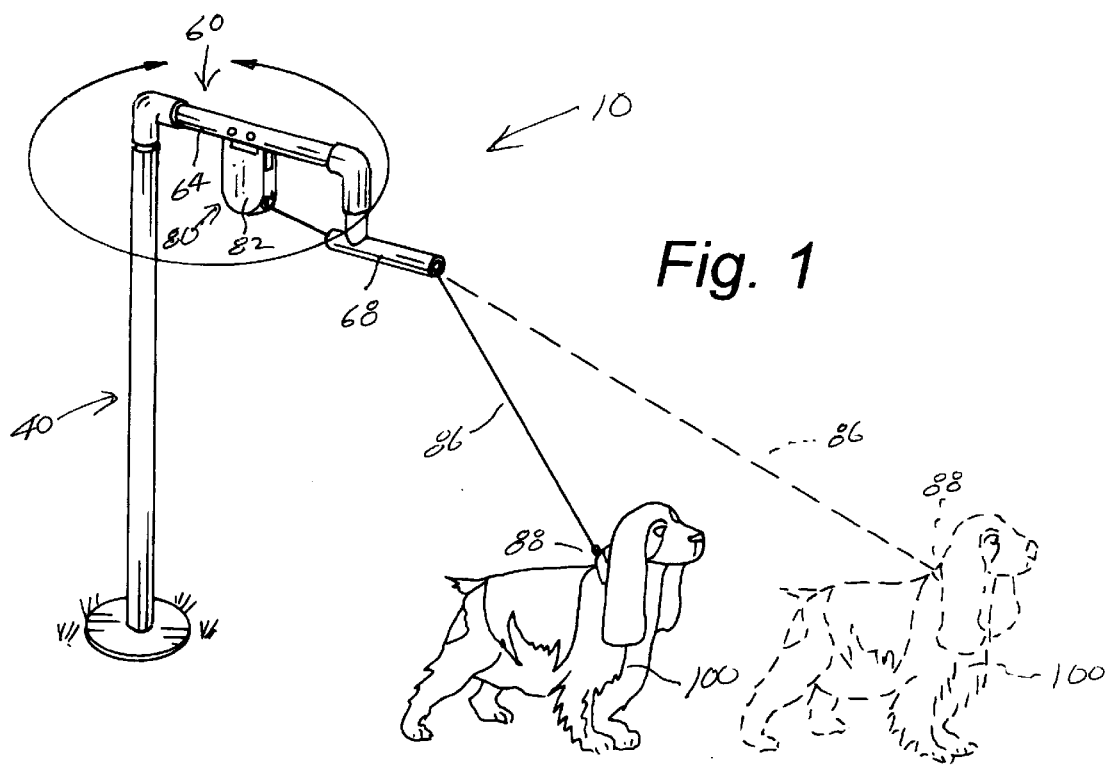
FIG. 1 is a perspective view showing the retractable leash support of the present invention.

As can be seen by reference to the drawings, and in particularly to FIG. 1, the retractable leash support that forms the basis of the present invention is designated generally by the reference number 10. The retractable leash support 10 includes a ground engaging base 20, a vertical support stand 40, a rotatable bracket arm 60, and the retractable leash 80.

As shown in FIG. 4, the base 20 includes a ground stake 22 with an attached pan blade 24. The top of the stake 22 extends up to connect to the support stand 40. The stake 22 may be fabricated fixed to the support stand 40, or received in the lower end of the support stand 40, as shown. An alternate pedestal base 20' could also be used. The support stand 40 may be made of tubular metal or plastic with an internal diameter sized to receive the stake 22 and the bracket arm 60. Also, the support stand 40 may be constructed to telescope to accommodate animals of varying size.

Figure 2:
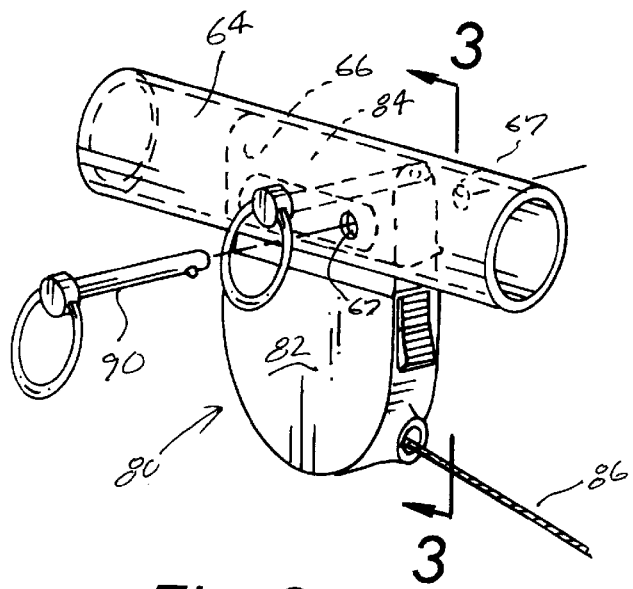
FIG. 2 is an enlarged partial perspective view illustrating the releasable attachment of the retractable leash to the rotatable bracket arm.

The bracket arm 60 is rotatably attached by a shaft 62 to the upper end of the support stand 40. If metal tubing is used, low friction discs such as Teflon, may be used to facilitate free rotation. As illustrated in FIG. 2, the horizontal section 64 of the bracket arm 60 includes a slotted opening 66, and the distal end carries an eyelet 68.

The retractable leash 80 has a housing 82 including a hand grip 84 defined by a closed loop. An elongated leash 86 having a free end 88 is movable between a retracted position and an extended position. The free end 88 is biased toward the retracted position with the housing 82, and the attached animal 100 exerts force on the leash 86 to pull it to the extended position.

Figure 3:
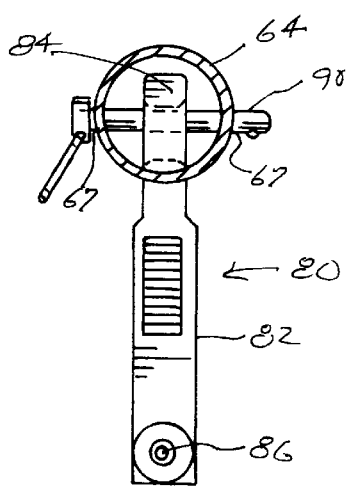
FIG. 3 is a sectional view taken along line 3—3 of FIG. 2.

As shown most clearly in FIGS. 2 and 3, the retractable leash 80 is positioned so that the hand grip 84 extends up into the slotted opening 66. Pins 90 are then positioned to extend through openings 67 and the closed loop forming the hand grip 84 to releasably secure the retractable leash 80 to the bracket arm 60. Once the housing 82 is attached, the free end 88 of the leash 86 is threaded through the eyelet 68 and attached to the collar of the animal 100. The eyelet 68 is generally horizontally aligned with the leash 86 where it extends from the housing 82 to provide a lever arm to facilitate rotation of the bracket arm 60 to follow the attached animal 100. It is also understood that the retractable leash 80 may be easily removed from the bracket arm 60 to be used in walking the animal 100.

FIG. 6 shows an alternate bracket arm 60' including shaft 62', horizontal section 64', and eyelet 68'. The bracket arm 60' also includes a container 70 with a hinged weatherproof cover 72. The retractable leash housing 82 is placed within the container 70, secured by a dowel pin 90', and the free end 88 of the leash 86 extends out of the container 70 and is threaded through the eyelet 68'. FIG. 5 shows an alternate container cover 72' that is friction fit instead of being hinged.

The retractable leash support 10 of the present invention is a safe alternative to the tying of an animal to a tree or stake. It is impossible for the animal to wrap the leash 86 around the vertical support 40 since the bracket arm 60 freely rotates to point the leash 86 in the direction of the animal 100 as it moves. The retractable leash support 10 is easily installed or relocated and provides safety and comfort for the animal 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A retractable leash support comprising:

a ground engaging base;

a vertical support having a lower end attached to and supported by the base, and an upper end;

a bracket arm rotatably attached to the upper end of the vertical support; and a retractable leash including a housing and an elongated leash having a free end biased toward the housing and being movable between a retracted position and an extended position, the housing of the retractable leash being releasably attached to the bracket arm and being rotatable therewith.

2. The apparatus of claim 1 wherein the bracket arm includes a distal end disposed to extend outwardly therefrom.

3. The apparatus of claim 2 further including an eyelet attached adjacent the distal end of the bracket arm, the eyelet being disposed to receive and guide the elongated leash as it moves between the retracted and extended positions.

4. The apparatus of claim 3 wherein the retractable leash housing includes a hand grip defined by a closed loop, and wherein a pin is disposed to extend through the closed loop to releasably interconnect the housing and the bracket arm.

5. The apparatus of claim 4 wherein the eyelet is horizontally aligned with a portion of the housing where the elongated leash extends therefrom.

6. The apparatus of claim 3 wherein the eyelet is horizontally aligned with a portion of the housing where the elongated leash extends therefrom.

7. The apparatus of claim 2 wherein the retractable leash housing includes a hand grip defined by a closed loop, and wherein a pin is disposed to extend through the closed loop to releasably interconnect the housing and the bracket arm.

8. The apparatus of claim 1 wherein the retractable leash housing includes a hand grip defined by a dosed loop, and wherein a pin is disposed to extend through the closed loop to releasably interconnect the housing and the bracket arm.

9. The apparatus of claim 8 wherein the bracket arm includes a slotted opening disposed to matingly receive the hand grip.

10. The apparatus of claim 1 wherein the bracket arm includes a container having a weatherproof cover, and wherein the retractable leash housing is disposed within the container with the free end of the elongated leash extending outwardly therefrom.

\* \* \* \* \*